(12) United States Patent
Gerges et al.

(10) Patent No.: US 10,126,068 B2
(45) Date of Patent: Nov. 13, 2018

(54) FLUID FLOW HEAT TRANSFER BOX FOR MULTIPLE FLUIDS WITH FLUID FLOW CONTROL DEVICE

(75) Inventors: Ihab Edward Gerges, Oakville (CA); Mark S. Kozdras, Oakville (CA); Benjamin Murray Lowry, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 892 days.

(21) Appl. No.: 13/332,461

(22) Filed: Dec. 21, 2011

(65) Prior Publication Data

US 2012/0160450 A1 Jun. 28, 2012

Related U.S. Application Data

(60) Provisional application No. 61/427,135, filed on Dec. 24, 2010.

(51) Int. Cl.
| | |
|---|---|
| *F28D 7/00* | (2006.01) |
| *F28F 27/02* | (2006.01) |
| *F28F 9/02* | (2006.01) |
| *F28D 21/00* | (2006.01) |

(52) U.S. Cl.
CPC ............ *F28D 7/0091* (2013.01); *F28F 27/02* (2013.01); *F28D 2021/0089* (2013.01); *F28F 9/0265* (2013.01); *F28F 2250/06* (2013.01); *F28F 2265/00* (2013.01)

(58) Field of Classification Search
CPC ......... B60H 1/18; B60K 11/04; F28D 1/0435; F28D 2021/0084; F28D 9/0043; F28D 21/0003; F28D 7/0091; F28D 2021/0089; F28F 27/02; F28F 2250/06; F28F 2265/00

USPC ... 165/41, 140, 157, 159, 160, 103, 96, 916, 165/167, 297, 296, 298; 236/12.13, 34.5
See application file for complete search history.

(56) References Cited

U.S. PATENT DOCUMENTS

| | | | | |
|---|---|---|---|---|
| 2,834,582 | A | * | 5/1958 | Kablitz ........................... 165/81 |
| 3,508,606 | A | * | 4/1970 | Anderson et al. ............. 165/145 |
| 4,327,802 | A | | 5/1982 | Beldam |

(Continued)

FOREIGN PATENT DOCUMENTS

| | | | |
|---|---|---|---|
| GB | 2309075 | | 7/1997 |
| GB | 2309075 A | * | 7/1997 .............. F01P 11/08 |

(Continued)

*Primary Examiner* — Len Tran
*Assistant Examiner* — Gordon Jones
(74) *Attorney, Agent, or Firm* — Marshall & Melhorn, LLC

(57) ABSTRACT

A heat exchanger apparatus includes a housing that defines a flow passage for a first fluid. The housing has a housing fluid inlet and a housing fluid outlet communicating with the flow passage. A first heat exchanger is located within the flow passage of the housing between the housing fluid inlet and the housing fluid outlet. The first heat exchanger has a plurality of channels for transmitting a second fluid through the first heat exchanger. The heat exchanger apparatus also includes a flow diverter in the flow passage, between the housing fluid inlet and the first heat exchanger, for diverting some of the first fluid to a by-pass region of the flow passage that by-passes the first heat exchanger. As well, a flow control device is in communication with the housing fluid inlet and controls a volume and location of the first fluid entering the flow passage.

10 Claims, 4 Drawing Sheets

(56) References Cited

U.S. PATENT DOCUMENTS

| | | | |
|---|---|---|---|
| 4,781,241 A | 11/1988 | Misage et al. | |
| 4,823,867 A | 4/1989 | Pollard et al. | |
| 5,014,775 A * | 5/1991 | Watanabe | B01D 35/18 123/196 AB |
| 5,465,783 A | 11/1995 | O'Connor | |
| 5,515,913 A | 5/1996 | Sanz | |
| 5,575,329 A * | 11/1996 | So et al. | 165/167 |
| 5,615,738 A | 4/1997 | Cameron et al. | |
| 5,896,834 A * | 4/1999 | Gruner | 123/41.33 |
| 6,182,749 B1 * | 2/2001 | Brost et al. | 165/297 |
| 6,568,467 B1 * | 5/2003 | Ohira et al. | 165/163 |
| 6,997,250 B2 * | 2/2006 | Dilley et al. | 165/174 |
| 7,458,340 B2 * | 12/2008 | Takeda et al. | 122/31.1 |
| 7,610,949 B2 | 11/2009 | Palanchon | |
| 2003/0006023 A1 * | 1/2003 | Hudson et al. | 165/51 |
| 2004/0159424 A1 * | 8/2004 | Reinke | F28D 9/005 165/140 |
| 2007/0125527 A1 * | 6/2007 | Flik | F02B 29/0412 165/140 |
| 2007/0295475 A1 * | 12/2007 | Samie et al. | 165/41 |
| 2008/0087410 A1 * | 4/2008 | Muller-Lufft | F02B 29/0462 165/165 |
| 2008/0121381 A1 * | 5/2008 | So | F28D 1/0333 165/140 |
| 2008/0121382 A1 * | 5/2008 | So | F28D 1/0333 165/140 |
| 2008/0196871 A1 * | 8/2008 | Lavanchy | F28B 1/02 165/143 |
| 2009/0000577 A1 | 1/2009 | Miyagawa | |
| 2009/0000775 A1 | 1/2009 | Al-Hadhrami | |
| 2009/0242178 A1 | 10/2009 | Al-Anizi et al. | |
| 2011/0056654 A1 * | 3/2011 | Vaughn et al. | 165/96 |
| 2012/0061060 A1 * | 3/2012 | Stoll | F01M 5/002 165/133 |

FOREIGN PATENT DOCUMENTS

| | | | | |
|---|---|---|---|---|
| JP | 3271518 | | 12/1991 | |
| JP | 3271518 A | * | 12/1991 | H01L 21/28 |
| JP | H10119556 A | | 5/1998 | |
| KR | 20060034238 A | | 4/2006 | |
| WO | WO 2010136108 A2 | * | 12/2010 | F01M 5/002 |

* cited by examiner

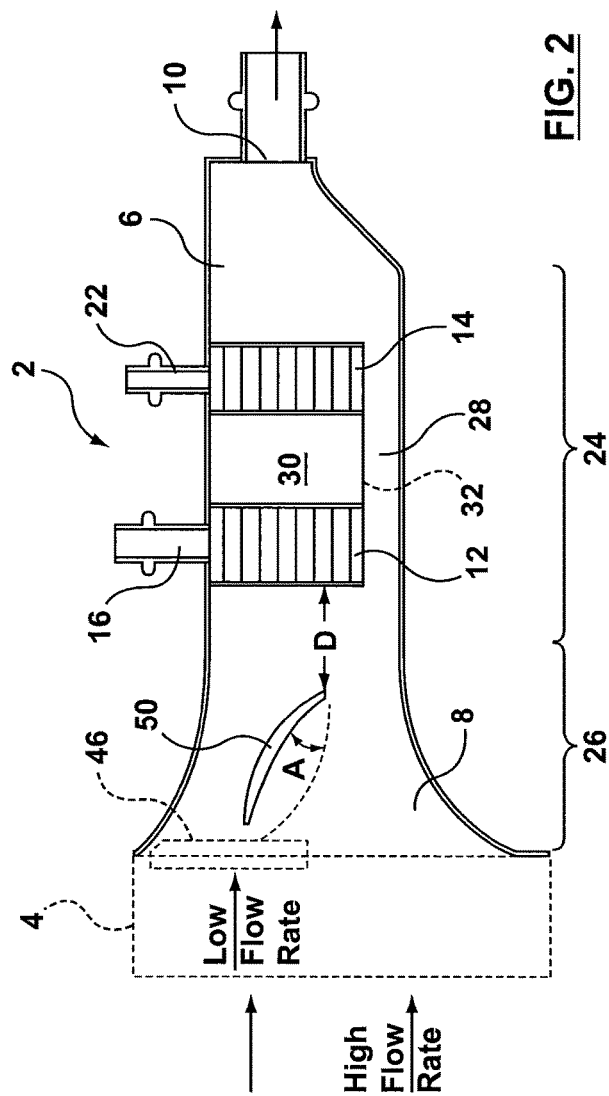
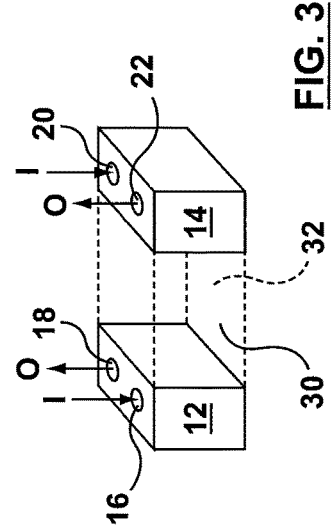
FIG. 2
FIG. 3

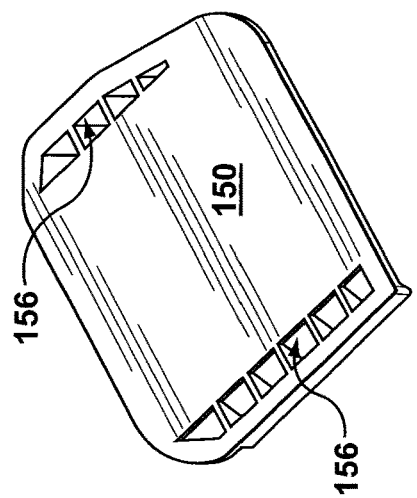
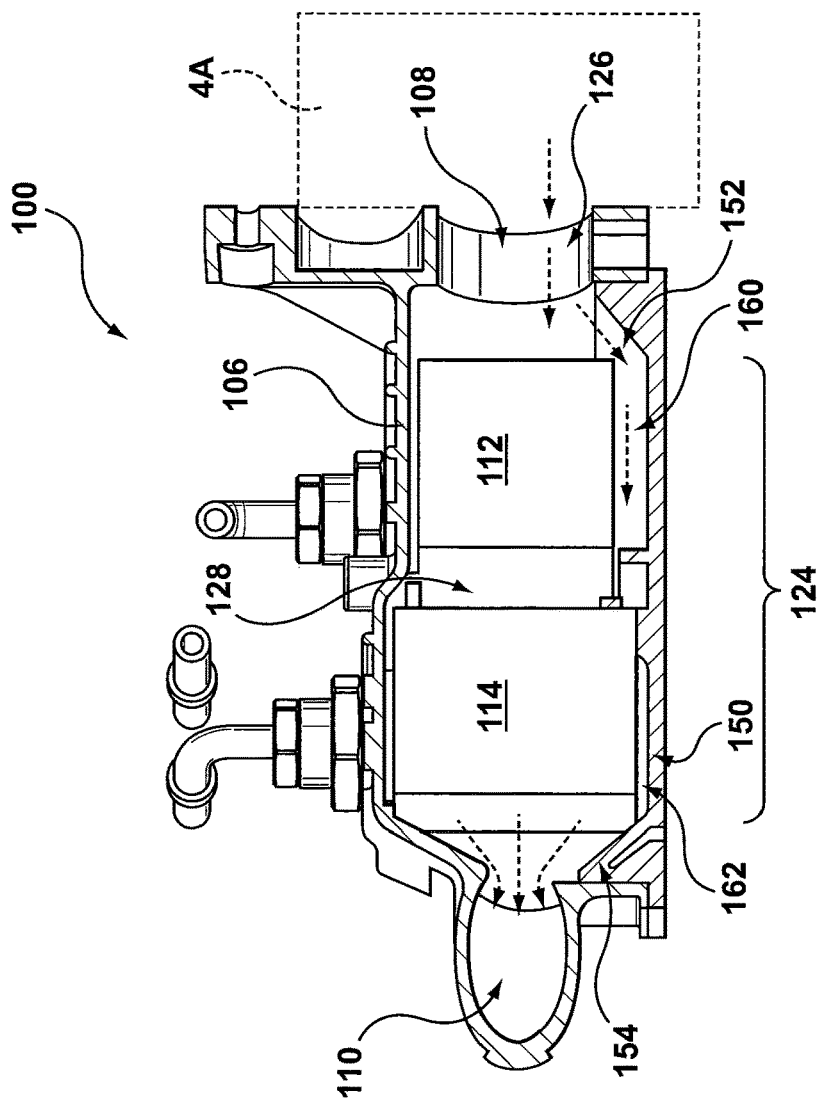
FIG. 5
FIG. 4

FLUID FLOW HEAT TRANSFER BOX FOR MULTIPLE FLUIDS WITH FLUID FLOW CONTROL DEVICE

CROSS REFERENCE TO RELATED APPLICATIONS

This application claims priority to and benefit from U.S. patent application Ser. No. 61/427,135 filed on Dec. 24, 2010 which is incorporated by reference in its entirety herein.

FIELD OF THE INVENTION

The specification relates to a heat exchanger apparatus (fluid flow mixing box) having fluid flow control features.

BACKGROUND OF THE INVENTION

A heat exchanger is a device that can facilitate heat transfer between two mediums. Heat exchangers can have many applications, including being used in vehicles for the purpose of heating/cooling oil, such as engine oil and/or transmission oil. For example, in a conventional operation, oil from an engine enters into a heat exchanger, which also has a liquid coolant passing through. The liquid coolant cools the oil within the heat exchanger, before the oil is returned to the engine. In the same way, transmission oil may be cooled in a vehicle.

Some heat exchangers provide a single housing for heat exchange of multiple fluids with liquid coolant, such as both transmission oil and engine oil in a vehicle. Such heat exchangers can have multiple different flow cores within the single housing. One of the challenges of such heat exchangers is that the fluid flowing through the single housing can have a detrimental impact on the different flow cores within the housing. For example, the fluid flowing through the single housing and contacting the flow cores where heat exchange takes place, can lead to corrosion due to impact of the fluid. This can also affect the performance of a vehicle and also effect fuel efficiency.

There is a need in the art for a heat exchanger apparatus that is used for heat exchange of multiple fluids with liquid coolant, such as both engine oil and transmission oil, and that can help to improve performance of a vehicle, such as by improving fuel efficiency and that can provide improved transmission and engine oil warm-up. In addition, there is a need in the art for a heat exchanger apparatus that can be used for heat exchange of multiple fluids with liquid coolant, like engine and transmission oils, and that can help to reduce the extent of corrosion that takes place due to the fluids flowing in the heat exchanger apparatus.

SUMMARY OF THE INVENTION

According to one embodiment of the present application, there is provided a heat exchanger apparatus containing:
a housing defining a flow passage for a first fluid and having a housing fluid inlet and a housing fluid outlet communicating with the flow passage;
a first heat exchanger located within the flow passage of the housing between the housing fluid inlet and the housing fluid outlet, the first heat exchanger having a plurality of channels for transmitting a second fluid therethrough;
a flow diverter in the flow passage between the housing fluid inlet and the first heat exchanger for diverting some of the first fluid to a by-pass region of the flow passage that by-passes the first heat exchanger; and
a flow control device in communication with the housing fluid inlet for controlling a volume and location of the first fluid entering the flow passage.

According to another embodiment of the present application, there is provided a heat exchanger apparatus containing:
a housing defining a flow passage for a first fluid, and having a housing fluid inlet and a housing fluid outlet communicating with the flow passage;
a first heat exchanger located within the flow passage of the housing between the housing fluid inlet and the housing fluid outlet, the first heat exchanger having a plurality of channels for transmitting a second fluid therethrough;
a downward inlet ramp formed at one end of the bottom of the housing and located between the housing fluid inlet and the first heat exchanger for directing some of the first fluid to a by-pass region of the flow passage that bypasses the first heat exchanger; and
a flow control device in communication with the housing fluid inlet for controlling a volume and source of the first fluid entering the flow passage.

BRIEF DESCRIPTION OF THE DRAWINGS

FIG. 2 is a sectional view of a fluid flow mixing box of according to another example embodiment; and FIG. 3 is a perspective view of two heat exchangers and a mixing zone membrane that are located within the fluid flow mixing box of FIG. 1.

FIG. 4 is a sectional view of a fluid flow mixing box according to a further example embodiment of the present application;

FIG. 5 is a perspective view of a bottom plate of the fluid flow mixing box of FIG. 4;

DESCRIPTION

Figure 1A:
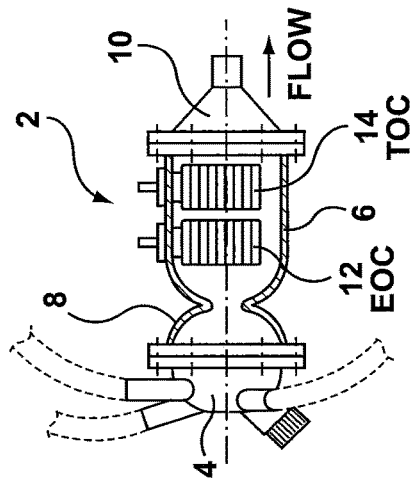
FIG. 1A is a sectional view of the fluid flow mixing box of FIG. 1.
Figure 1:
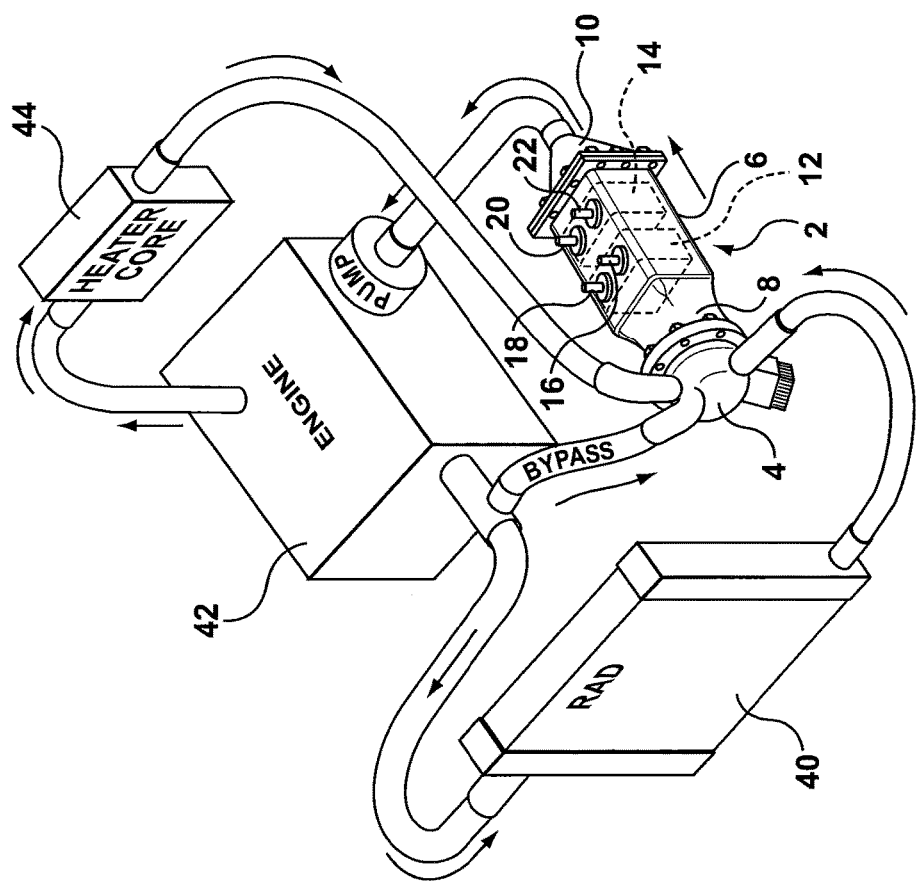
FIG. 1 illustrates a fluid flow mixing box (heat exchanger apparatus) according to an example embodiment connected to an engine and other components.

According to an example embodiment, a fluid flow mixing box 2 (the heat exchanger apparatus disclosed herein is described as a fluid flow mixing box) is shown integrated into an engine system in FIG. 1. The fluid flow mixing box 2 includes an external body or housing 6 that defines a fluid flow inlet 8 at one end thereof and a fluid flow outlet 10 at an opposite end that permits a complete lateral fluid flow from the fluid flow inlet 8 to the fluid flow outlet 10. The material of construction of the housing 6 is not particularly limited and depends upon the particular application. In one embodiment, the housing 6 may be made of plastic, such as nylon 66. Additionally, in an alternate embodiment, the exterior of the housing 6 may be insulated to improve cold warm-up performance.

In operation, a heat exchange fluid (for example water, coolant or other liquid) flows through the housing 6 from the inlet 8 to the outlet 10. In the illustrated example of FIGS. 1A and 2, a first heat exchanger 12 and a second heat exchanger 14 are positioned at spaced apart locations within the housing 6 between the inlet 8 and outlet 10, with the first heat exchanger 12 being located up-stream or forward of the second heat exchanger 14 relative to the flow of the heat exchanger fluid from the inlet 8 to the outlet 10. In one example embodiment, as seen in FIGS. 1 and 2, the housing 6 includes a generally box-like central rectangular region 24 in which the heat exchangers 12, 14 are located.

In one example embodiment, the first heat exchanger 12 is an engine oil cooler (EOC) having an inlet 16 for receiving engine oil from an engine and an outlet 18 for returning oil to an engine, and the second heat exchanger 14 is a transmission oil cooler (TOC) having an inlet 20 for receiving oil from a transmission and an outlet 22 for returning oil to a transmission. However, the order of the heat exchangers 12, 14 could be reversed in some applications, and the number and type of heat exchangers can also vary in different applications and configurations.

In an example embodiment, heat exchangers 12 and 14 are each stacked tube style heat exchangers and are each formed from a plurality of aligned, stacked tube members that each define an internal passage for a fluid (for example, engine oil or transmission oil in the presently described embodiment) between a fluid inlet manifold and a fluid outlet manifold. Spaces are provided between the stacked tubes for the heat exchanger fluid to flow through such that heat can be transferred between the heat exchanger fluid flowing through the mixing box housing 6 and respective fluids flowing through the first and second heat exchangers 12 and 14. Fins could be located between the stacked tubes of each heat exchanger to improve heat exchange efficiency and strength. Alternatively, the stacked tubes may include outer facing ribs or dimples or other protuberances to achieve a similar function. In some embodiments, the stacked tubes could be formed from plate pairs brazed together. In some example embodiments, the heat exchangers 12, 14 are constructed from metal such as aluminum or aluminum alloy, however other materials could be used. In an embodiment, the first and second heat exchangers 12 and 14 are configured as tall and thin stacked tubes.

In one example embodiment, as shown in FIG. 3, the location of the fluid inlet 16 and fluid outlet 18 (and their respective inlet and outlet manifolds) on the first heat exchanger 12 are reversed relative to the location of the fluid inlet 20 and fluid outlet 22 (and their respective inlet and outlet manifolds) on the second heat exchanger 14 such that heat exchanger fluid passing through a hotter region of the first heat exchanger 12 (for example the inlet manifold side) is generally directed to a cooler region of the second heat exchanger 14 (for example the outlet manifold side).

In an example embodiment, the fluid flow mixing box 2 is combined with a mixing valve 4 which is connected at the mixing box inlet 8 to control the source and flow rate of heat exchanger fluid provided to the mixing box 2. As seen in FIG. 1, in the illustrated example the mixing box 2 may for example receive heat exchanger fluid from: i) the output of an engine radiator 40; ii) directly from an engine 42 through a bypass line; and iii) from a heater core 44. The mixing valve 4 is configured to control how much heat exchanger fluid comes from each of the above three sources at any given time, thereby allowing the mixing box 2 to be used to warm up the fluids flowing through heat exchangers 12, 14 at certain times during operation of the engine system and to cool the fluids flowing through heat exchangers 12, 14 at other times. In an alternative embodiment (not shown) the fluid flow mixing box 2 may receive heat exchanger fluid only from i) the output of the engine radiator 40; and ii) from the heater core 44. In this embodiment, the fluid flow mixing box 2 does not receive heat exchanger fluid directly from the engine 42.

In an example embodiment, as seen in FIG. 2, the inlet 8 is defined by a conical wall region 26 at the front end of the housing 6. As shown in FIG. 2, a heat exchanger fluid bypass gap or region 28 is provided between at least one of the walls of the housing 6 and the heat exchangers 12 and 14 such that at least some of the heat exchanger fluid flowing through heat exchanger box central region 24 can by-pass the heat exchangers 12 and 14.

Referring to FIGS. 2 and 3, the region between the first and second heat exchangers 12 and 14 provides a heat exchanger fluid mixing zone 30 in which the heat exchanger fluid passing through adjacent inter-tube spaces in first heat exchanger 12 mix together prior to passing through the second heat exchanger 14. The tubes which form the first heat exchanger 12 can have trailing profiles to facilitate such mixing. As illustrated in phantom lines in FIGS. 2 and 3, in one example embodiment the mixing zone 30 may be delineated from the rest of the heat exchanger fluid flow zone within the housing 6 by a mixing zone membrane 32 such that heat exchanger fluid that is flowing through the bypass region 28 does not mix with heat exchanger fluid within the mixing zone 30. Housing 6 and mixing zone membrane could be formed of suitable rigid materials, including plastic materials for example.

In an example embodiment, the mixing valve 4 is configured to direct flow to different areas of the conical inlet 8 at different flow rates. For example, at low flow rates, the mixing valve 4 may open orifices near a top region 46 (see FIG. 2) of the conical inlet 8 such that the majority of heat exchanger fluid entering the heat exchanger box housing 6 is directed towards the first heat exchanger 12 rather than towards the by-pass region 28. However, at a higher flow rate, the heat exchanger fluid flow may be more evenly directed across the entire area of the conical inlet 8. An issue at higher flow rates is that the high flow will quickly erode the first heat exchanger 12 and second heat exchanger 14. Accordingly, to mitigate against erosion, in example embodiments a passive, stationary flow diverter 50 is fixed in the conical inlet 8 to divert a substantial portion of high flow rate heat exchanger fluid entering inlet 8 away from the first heat exchanger 12 and towards the by-pass region 28 instead.

In an example embodiment, the flow diverter 50 has an aerofoil profile, is spaced a distance "D" upstream from the heat exchanger 12 and is angled at an angle "A" to a central axis of mixing box 2 in order to direct substantial portions of the heat exchanger fluid flow entering the mixing box 2 to the bypass region 28.

Accordingly, in an example embodiment, at low fluid flow rates the mixing valve 4 introduces most of the heat exchanger fluid to an upper low-flow input region 46 of the conical inlet 8 that is aligned with the first heat exchanger 12 but offset from the by-pass flow region 28. The flow diverter 50 generally does not extend into the flow path between the upper low-flow region 46 and the first heat exchanger 12 such that the majority of the heat exchange fluid entering the inlet at the region 46 at a low flow rate will have a clear path to flow past the flow diverter 50 and through the first heat exchanger 12, into the mixing zone 30, through the second heat exchanger 14 and then out through mixing box outlet 10. As a result, flow through the heat exchangers 12 and 14 at low flow rates is optimized with relatively low volume of heat exchanger fluid going through the bypass region 28.

At maximum flow rates, the mixing valve 4 introduces heat exchanger fluid evenly across substantially the entire inlet area of the conical inlet 8. The flow diverter 50 can, in one embodiment, direct a large percentage of the incoming heat exchanger fluid towards the bypass region 28 (by way of non limiting example, greater than 50%), leaving a sufficient flow going through the heat exchangers 12 and 14 to achieve a desired heat exchange result without excessive erosion.

The size, shape and general dimensions of the flow diverter 50, inlet opening 8, by-pass region 28 and other components of the mixing box 6 can be selected to optimize heat transfer efficiency while maintaining acceptable corrosion levels based on a particular application.

FIG. 4 illustrates a second example embodiment of a fluid flow mixing box according to the present application. Similar to the first example embodiment, fluid flow mixing box 100 includes an external body or housing 106 that defines a fluid flow inlet 108 and a fluid flow outlet 110. In an embodiment, the housing 106 includes a generally box-like central rectangular region 124 in which the heat exchangers 112, 114 are located. As well, in the second example embodiment, the housing 106 further comprises a bottom wall 150 that can be attached to the bottom of the fluid flow mixing box 100. The bottom wall 150, for example, may be welded to the fluid flow mixing box 100. In another embodiment, the bottom wall 150 may be formed as part of the housing, and not a separate piece attached to the housing.

In operation a heat exchange fluid (for example water, coolant or other liquid) flows through the housing 106 from the inlet 108 to the outlet 110. A first heat exchanger 112 and a second heat exchanger 114 are positioned at spaced apart locations within the housing 106 between the inlet 108 and the outlet 110. The first heat exchanger 112 is located forward of the second heat exchanger 114 relative to the flow of the heat exchanger fluid from the inlet 108 to the outlet 110. As well, in some embodiments, the first and second heat exchangers 112 and 114 may be of the same form and configuration as described in relation to the first example embodiment.

The second example embodiment of the fluid flow mixing box 100 can help to address a situation where the first heat exchanger 112 and the second heat exchanger 114 have different heat transfer requirements. For example, in some instances the first heat exchanger 112 requires less fluid to heat and/or cool than the second heat exchanger 114. Accordingly, in the second example embodiment the order of the heat exchangers can come into consideration for obtaining the desired functionality, in that the heat exchanger with lower heat transfer requirements is located first after the inlet 108. In an embodiment, the first heat exchanger 112 is an engine oil cooler (EOC) having an inlet 116 and an outlet 118 for receiving oil from an engine and returning oil to an engine, respectively; and the second heat exchanger 114 is a transmission oil cooler (TOC) having an inlet 120 and outlet 122 for receiving and returning oil from and to a transmission.

Referring to FIG. 4, the inlet 108 is defined by cylindrical wall 126 at one end of the housing 106. As in the previous embodiment, a mixing valve 4A (noted as a phantom box in FIG. 4) is configured to control the source and flow rate of the heat exchange fluid into the mixing box 100. The mixing valve 4A may provide different flows to different areas of the inlet 108, as in the previous embodiment.

As seen in FIG. 4, the first and second heat exchangers 112, 114 are positioned in a way such that the space between the bottom plate 150 of the housing 106 and the first heat exchanger 112 is greater than the space between the bottom plate 150 and the second heat exchanger 114. The by-pass region 160 between the bottom of the first heat exchanger 112 and the top of the bottom plate 150 is of a size that is sufficient to provide a stream of flow of the heat exchange fluid underneath the first heat exchanger 112. The space 162 between the bottom of the second heat exchanger 114 and the bottom plate 150 is smaller than the by-pass region 160. Accordingly, the by-pass region 160 provides a bypass area underneath the first heat exchanger 112, but space 162 provides little area under the second heat exchanger 114 for heat exchange fluid to pass.

Furthermore, the region between the first heat exchanger 112 and the second heat exchanger 114 provides a heat exchanger fluid mixing zone 128 in which the heat exchanger fluid passes through the first heat exchanger 112 and mixes with the heat exchanger fluid that passes under the by-pass region 160. The mixed heat exchanger fluid then passes through the second heat exchanger 114.

As seen in FIG. 4, the bottom plate 150 comprises a downward inlet ramp 152 located after the inlet 108, and an upward outlet ramp 154 located prior to the outlet 110, and a flat bottom section connecting the lower ends of the inlet ramp 152 and the outlet ramp 154. FIG. 5 illustrates a perspective view of the bottom plate 150, showing ribs 156 located under the ramps 152, 154. In an embodiment, the ramps 152, 154 are integrated into the bottom plate 150 and may be made of moulded plastic.

The bottom plate 150 acts as a flow diverter as the ramp 152 directs the flow of heat exchange fluid into the fluid flow mixing box 100, and into the by-pass region 160, and the ramp 154 directs the flow of the heat exchange fluid out of the fluid flow mixing box 100. The ramps 152, 154 can also help to reduce the height of the heat exchange fluid in the box. Additionally, the angle of the ramps 152, 154 can help to reduce pressure drop losses in the fluid flow mixing box 100. Accordingly, the design of the bottom plate 150 with the ramps 152, 154 can increase the efficiency of the fluid flow mixing box 100.

The configuration of the fluid flow mixing box 100, including mixing area 128 between the first and second heat exchangers 112, 114, and the by-pass region 160 between the first heat exchanger 112 and the bottom plate 150, creates a flow splitter. In operation, the incoming flow passes through the mixing valve 4A and inlet 108 into the core of the first heat exchanger 112, but is also partly diverted by the inlet ramp 152 and the by-pass region 160 around the first heat exchanger 112. The diverted flow is mixed and combined with the exhaust flow from the first heat exchanger 112 in the mixing area 128, and is then passed into the second heat exchanger 114. This configuration of the components of the fluid flow mixing box 100 can provide the required flow rate and coolant temperature required to cool and/or heat the second heat exchanger 114. The ramps 152, 154 and the spaces 160,162 control the degree of flow splitting occurring within the fluid flow mixing box 100. This flow splitting can also provide the anti-corrosion effect that the flow diverter provides in the first example embodiment.

Figure 6:
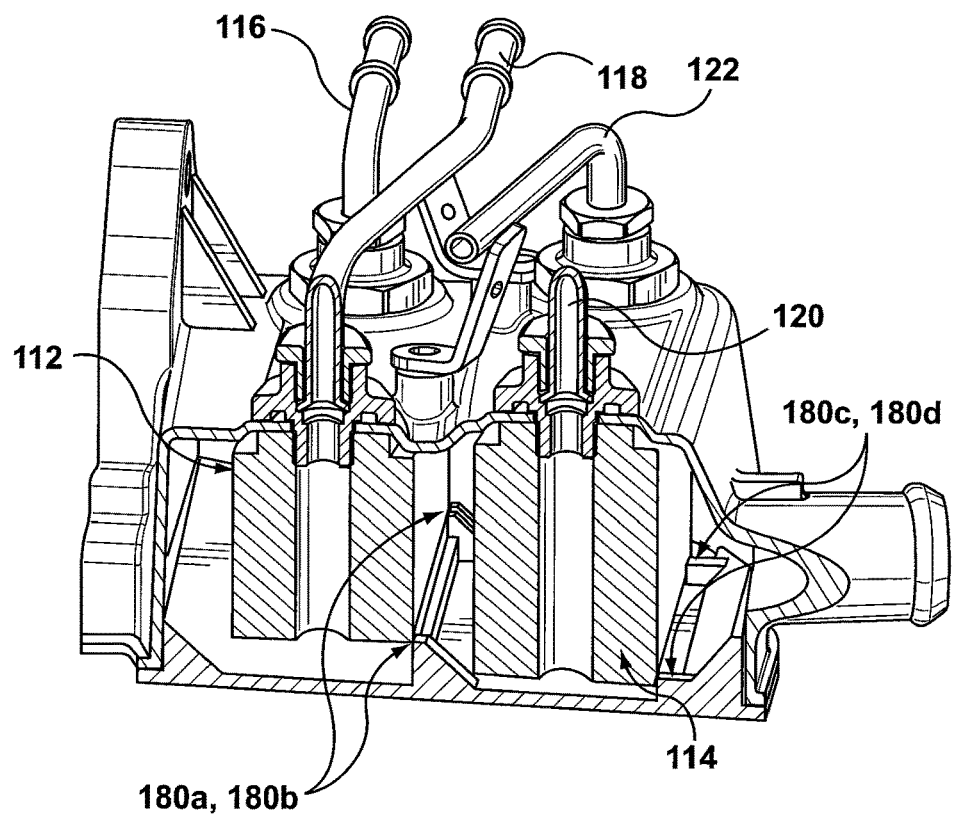
FIG. 6 is another sectional view of the fluid flow mixing box according to a further example embodiment.
Figure 7:
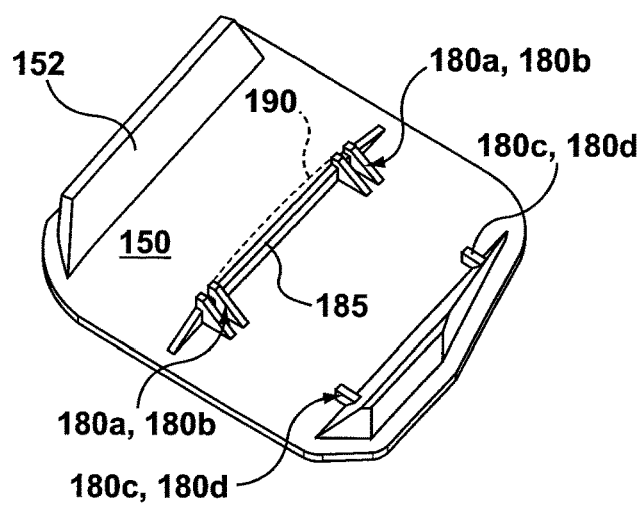
FIG. 7 is a top view of a bottom plate of the fluid flow mixing box of FIG. 6.

In an embodiment, the bottom plate 150 comprises support tabs which act as a support means for the first heat exchanger 112 and the second heat exchanger 114. Referring to FIGS. 6 and 7, in an embodiment, there are four support tabs extending up from the inner (top) surface of the bottom plate 150. The first set of support tabs used to support the first heat exchanger 112 comprise two support protrusions 180a,180b spaced apart in the middle of the bottom plate 150. The second set of support tabs used to support the second heat exchanger 114 comprise two support protrusions 180c, 180d which are spaced apart, and extend up from the inner surface of the bottom plate 150 and extend away from the outlet ramp 154. Each set of support tabs support the downstream sides of the first and second heat exchangers 112 and 114. Accordingly, the support protrusions 180a, 180b, 180c, 180d provide support for the heat exchangers 112, 114 and can help to prevent them from deflecting due to the forces applied by the flowing heat exchange fluid. The support protrusions 180a, 180b, 180c, 180d may be made of moulded plastic.

The bottom plate 150 further comprises a member 185 that extends up from the inner surface of the bottom plate 150, and that connects the two support protrusions 180a, 180b. The two support protrusions 180a, 180b are taller in height than the member 185. The member 185 can be located, for example, approximately in the middle of the bottom plate 150, and extends across the width of the bottom plate 150 and can provide structural strength to the bottom plate 150. As well, the member 185 can provide additional control of the degree of flow splitting. There is a space 190 between the bottom of the first heat exchanger 112 and the top of the member 185 in order to allow a flow of the heat exchange fluid underneath the first heat exchanger 112 and over the member 185. As well, the member 185 further restricts the flow of fluid under the second heat exchanger.

The integrated coolant flow control and heat exchanger device described herein can help to improve fuel economy, reduces vehicle weight, and reduces the overall parts in a vehicle assembly. The fluid flow mixing box of the present application can also help to provide faster transmission and engine oil warm-up and provides a fuel economy benefit. With respect to engine cooling, the fluid flow mixing box of the present application can provide a smaller engine cooling module, which reduces costs and the volume of the coolant.

While the present invention has been described with reference to example embodiments and the accompanying drawings, it will be understood by those skilled in the art that the invention is not limited to the preferred embodiment and that various modifications could be made thereto without departing from the scope of the invention as defined by the claims.

The invention claimed is:

1. A heat exchanger apparatus comprising:
a housing defining a lateral flow passage for a first fluid, and having a housing fluid inlet and a housing fluid outlet communicating with the flow passage; the housing fluid inlet being formed to permit complete lateral fluid flow of the first fluid from the housing fluid inlet to the housing fluid outlet;
a first heat exchanger located within the flow passage of the housing between the housing fluid inlet and the housing fluid outlet, the first heat exchanger having a plurality of channels for transmitting a second fluid therethrough;
a second heat exchanger located within the flow passage of the housing between the first heat exchanger and the housing fluid outlet, the second heat exchanger having a plurality of channels for transmitting a third fluid therethrough, and wherein the second heat exchanger is spaced-apart from the first heat exchanger providing a first fluid mixing zone between the first heat exchanger and the second heat exchanger; the first fluid mixing zone permitting mixing of the first fluid after passing through the first heat exchanger;
a downward inlet ramp formed from and at one end of a bottom wall of the housing and located between the housing fluid inlet and the first heat exchanger, the downward inlet ramp directing some of the first fluid to a by-pass region of the flow passage that bypasses the first heat exchanger, wherein the first fluid mixing zone permitting mixing of the first fluid after passing through the first heat exchanger with the first fluid from the by-pass region before flow through the second heat exchanger; and
a flow control device coupled to an internal wall of the housing and in communication with the housing fluid inlet for controlling a volume and source of the first fluid entering the flow passage.

2. The heat exchanger apparatus of claim 1, wherein the housing bottom wall further comprises at a second end an upward outlet ramp, the upward outlet ramp directing the first fluid out of the flow passage.

3. The heat exchanger apparatus of claim 1, wherein the housing bottom wall further comprises two or more protrusions extending from the inner surface of the housing bottom wall, the two or more protrusions supporting a downstream edge of the first heat exchanger against forces applied by the flowing first fluid.

4. The heat exchanger according to claim 3, further comprising additional protrusions extending from the inner surface of the housing bottom wall, the additional protrusions supporting a downstream edge of the second heat exchanger against forces applied by the flowing first fluid.

5. The heat exchanger apparatus of claim 1, wherein the flow control device is a mixing valve that is configured to receive the first fluid from more than one source.

6. The heat exchanger apparatus of claim 5, wherein the mixing valve is configured to control the source of the first fluid based on a heating requirement.

7. The heat exchanger apparatus of claim 1, wherein the bottom wall of the housing further comprises a centrally located support member extending up from the inner surface of the bottom wall and across the width of the bottom wall for providing structural strength.

8. The heat exchanger apparatus of claim 7, wherein a gap is located between the centrally located support member and the first heat exchanger, the gap permitting the flow of the first fluid under the first heat exchanger and over the centrally located support member.

9. The heat exchanger apparatus of claim 1, wherein the first heat exchanger has a different configuration from the second heat exchanger.

10. The heat exchanger apparatus of claim 1, wherein the first heat exchanger and the second heat exchanger are positioned that space between a bottom wall of the housing and the first heat exchanger is greater than space between the bottom wall of the housing and the second heat exchanger.

* * * * *